United States Patent [19]
Nishijima et al.

[11] Patent Number: 4,769,851
[45] Date of Patent: Sep. 6, 1988

[54] APPARATUS FOR RECOGNIZING CHARACTERS

[75] Inventors: Yasuo Nishijima; Kazunari Egami, both of Tokyo, Japan

[73] Assignee: NEC Corporation, Tokyo, Japan

[21] Appl. No.: 917,132

[22] Filed: Oct. 9, 1986

[30] Foreign Application Priority Data

Oct. 9, 1985 [JP] Japan .................. 60-226153

[51] Int. Cl.$^4$ .............................. G06K 9/64
[52] U.S. Cl. .......................... 382/34; 382/47
[58] Field of Search .................... 382/34, 47, 50

[56] References Cited

U.S. PATENT DOCUMENTS 3,289,164 11/1966 Rabinow ................................ 382/47
3,644,890 2/1972 Matthews ............................. 382/50

*Primary Examiner*—Leo H. Boudreau
*Assistant Examiner*—Donald J. Daley
*Attorney, Agent, or Firm*—Sughrue, Mion, Zinn, Macpeak & Seas

[57] ABSTRACT

An apparatus for recognizing characters with high recognition accuracy. The width of a character is measured, and the character is normalized in the direction of height only when the measured width is smaller than a predetermined value and in the direction of both height and width irrespective of the measured width. The normalized characters are compared and collated with a reference, and a category of the reference having the higher degree of coincidence is provided as a recognition result.

7 Claims, 3 Drawing Sheets

FIG. 1A
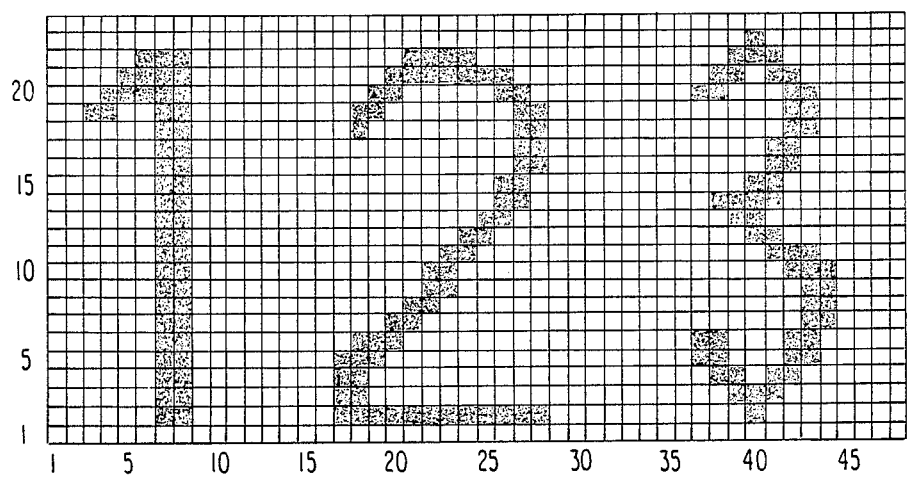
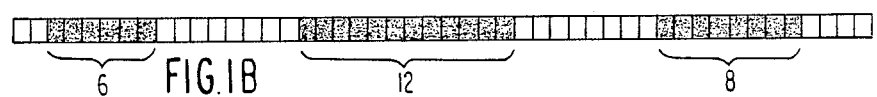
FIG. 1B
FIG. 2A
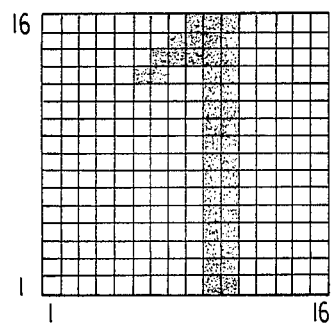
FIG. 2B
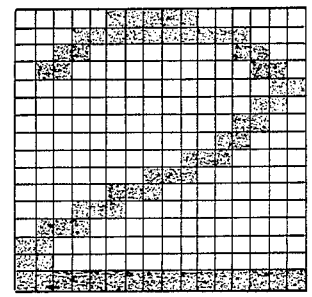
FIG. 2C
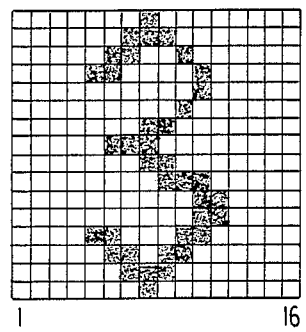

APPARATUS FOR RECOGNIZING CHARACTERS

BACKGROUND OF THE INVENTION

The present invention relates to an apparatus for recognizing characters, and particularly to an improvement in recognition accuracy thereof.

One of conventional apparatus for recognizing characters of this type can be represented by a template matching system. This apparatus converts characters printed or typewritten on a paper into electric binary video signals through a photoelectric converter element, separates successive characters from one another, normalizes them so that each character will have a predetermined size, compares and collates them with a reference dictionary which stores reference figures, selects from the dictionary a most similar category of the figure to the normalized character, and regards the category as a result of character recognition.

According to this apparatus for recognizing characters, however, characters having small widths, such as "1", "i", "j", or "r" and like characters are not normalized in the direction of width. This is because, if these narrow width characters are normalized, they may be recognized as a category "1". Therefore, when characters having small widths in addition to the above-mentioned characters "1", "i", "j", "r" are input, they are not normalized and may be rejected or may be erroneously recognized. These inconveniences will now be described in conjunction with the drawings.

FIG. 1A shows examples of input figures (numerals 1, 2, 3) in meshes. Prior to recognizing the characters (figures), the input fingers are cut out one character by one character, and the height and width are detected for each of the characters. In FIG. 1A, the numeral "1" has a height of 21 mesh and a width of 6 mesh, the numeral "2" has a height of 21 mesh and a width of 12 mesh, and the numeral "3" has a height of 22 mesh and a width of 8 mesh. Means for cutting out the characters or for detecting the shapes of characters are widely known in the art and are not described here. FIG. 1B shows the projection result employed for detecting the width, i.e., it shows figures in which logical products are found in the vertical direction.

If the input characters having widths of as small as 10 mesh or less are not normalized in the lateral direction but are normalized in the direction of height only, the figures of the normalized characters are shown in FIGS. 2A, 2B and 2C. The figures after normalization have a size of 16×16 mesh.

FIGS. 3A to 3F illustrate examples of references stored in the reference dictionary in the template matching system. FIGS. 3A and 3B illustrate reference figures of the numeral "1", wherein marks "X" in FIG. 3A denote points that should be black and marks "X" in FIG. 3B denote points that should be white. Similarly, FIGS. 3C, 3D and 3E, 3F illustrate reference figures of the numerals "2" and "3", respectively.

Here, if FIGS. 2 and 3 are compared and collated, the non-coincident numbers in "1" and "2" are 1 and 0, respectively. For "3", however, the non-coincident number is 30 or more. Namely, though "1" and "2" are properly recognized, the reading of "3" is rejected.

SUMMARY OF THE INVENTION

Therefore, an object of the present invention is to provide an apparatus for recognizing characters having high recognition accuracy.

Another object of the present invention is to provide an apparatus for recognizing characters having small width.

According to the present invention, there is provided an apparatus for recognizing characters comprising: character width detecting means which measures the width of a character, first normalizing means which normalizes the character in the directions of height and width, second normalizing means which normalizes the character in the direction of height only when the measured width value is smaller than a preset value, first and second comparator means which compare and collate the thus normalized characters with a reference, and recognition means which selects a category of the reference having a higher coincidence degree as a recognition basis.

Other objects and features of the present invention will be clarified by the following description with reference to the drawings.

BRIEF DESCRIPTION OF THE DRAWINGS

FIGS. 1A and 1B show examples of conventional input figures;

FIGS. 2A to 2C show conventional normalized figures of the characters;

PREFERRED EMBODIMENT OF THE INVENTION

An embodiment of the present invention will now be described in conjunction with FIGS. 4 and 5 of the drawings.

Figure 3A:
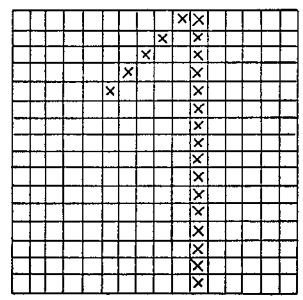
FIGS. 3A to 3F illustrate conventional references stored in the reference dictionary.
Figure 3B:
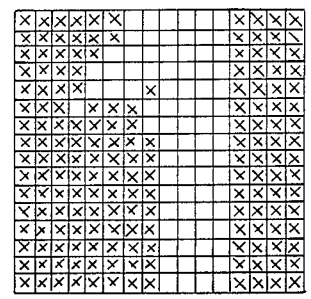
Figure 3C:
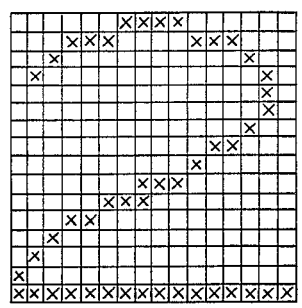
Figure 3D:
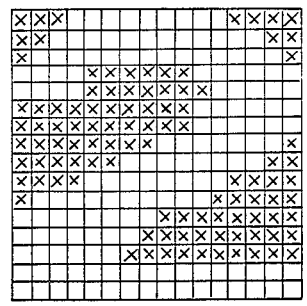
Figure 3E:
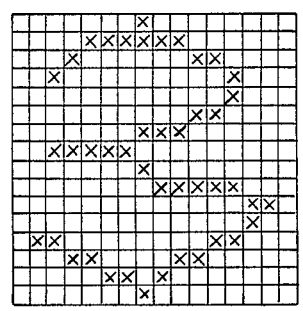
Figure 3F:
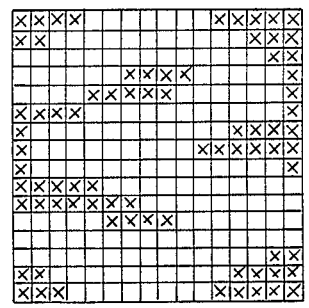
Figure 4:
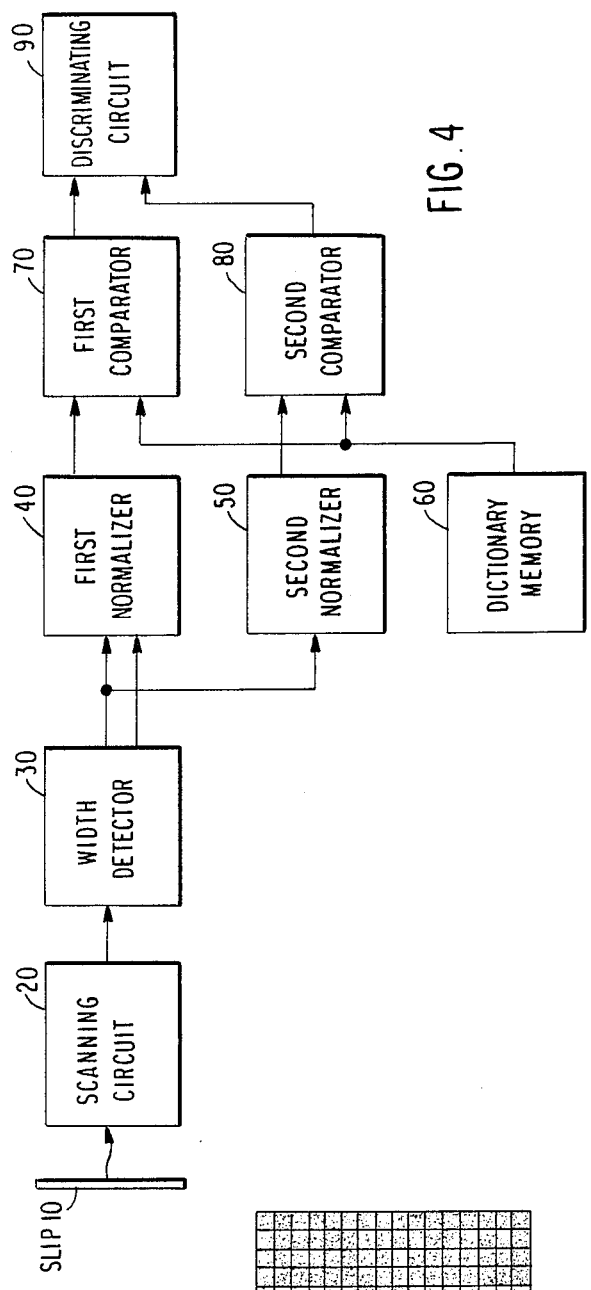
FIG. 4 shows a block diagram of the present invention.

FIG. 4 shows a block diagram illustrating major portions of an apparatus for recognizing characters according to an embodiment of the present invention.

A scanning circuit 20 scans the characters described on a slip 10, converts them into electric binary video signals, separates them into individual characters, and sends video signals thereof as input figures to a character width detecting circuit 30. The characters can be easily separated by a widely known technique which is not described here.

The character width detecting circut 30 measures the width of each of the characters. When the width is smaller than a preset value, the character width detecting circuit 30 sends the input figure to a first normalizing circuit 40 and a second normalizing circuit 50. When the width is larger than the preset value, the characer width detecting circuit 30 sends the input figure to the first normalizing circuit 40 only. The first normalizing circuit 40 normalizes the input figure sent from the character width detecting circuit 30 in the directions of both height and width with the aid of information from a height detector (not shown), and sends the normalized figure to a first comparator circuit 70. The second normalizing circuit 50 normalizes the input figures sent from the character width detecting circuit 30 in the direction of height only, and sends the normalized figure to a second comparator circuit 80. A dictionary memory 60 stores a plurality of reference figures consisting of a plurality of categories for recognizing the normalized figures. The reference figures are successively sent to the first comparator circuit 70 and to the second comparator circuit 80. The first comparator circuit 70 compares and collates the input figures with the reference figures sent from the dictionary memory 60, and sends a degree of coincidence and a category thereof to a discriminating circuit 90. The second comparator circuit 80 compares and collates the input figures with the reference figures sent from the dictionary memory 60, and sends a degree of coincidence and a category thereof to the discriminating circuit 90. The discriminating circuit 90 compares the degrees of coincidence sent from the first and second comparator circuits 70 and 80, and regards the category having a smaller degree of non-coincidence, i.e., having a larger degree of coincidence, to be the result of decision of input figure.

FIG. 5 shows normalized characters in accordance with the present invention.

Figure 5A:
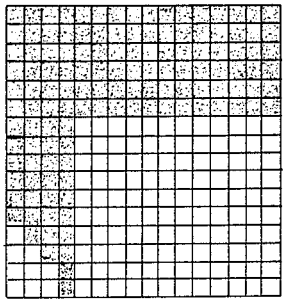
FIGS. 5A-5E show normalized characters in the present invention.
Figure 5E:
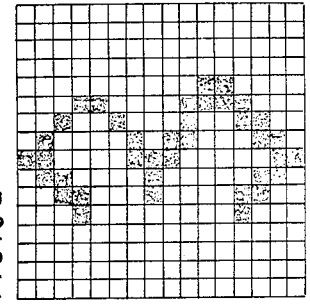
Figure 5B:
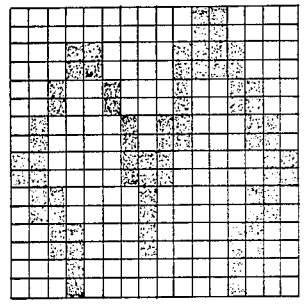

FIGS. 5A, 5B, 5C and 5D illustrate figures that are normalized in the directions of both height and width. The original characters have widths of 10 mesh or less. FIGS. 5B and 5E show the characters of FIGS. 5A and 5D normalized in the direction of height only.

Figure 5C:
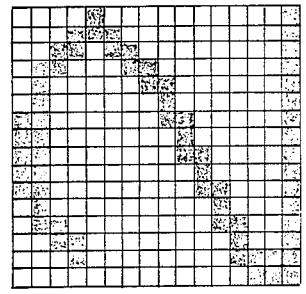
Figure 5D:
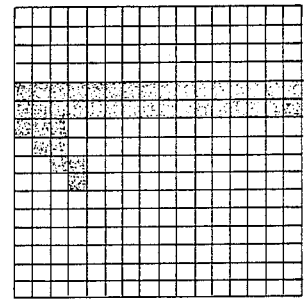

If these figures are compared and collated with the reference figures of FIGS. 3A to 3F, FIGS. 5A has a non-coincidence numbers of larger than 30, FIG. 5B has a non-coincidence number of 1, FIG. 5C has a non-coincidence number of 0, FIG. 5D has a non-coincidence number of 0 and FIG. 5E has non-coincidence number of greater than 30.

As compared and collated above, the characters are recognized relying upon the input figures "1", "2" and "3" having smaller non-coincidence numbers i.e., relying upon the results of non-coincidence numbers of FIGS. 5B, 5C and 5D.

As described above, the present invention measures the widths of input figures even for those characters having small widths in addition to such characters as "1", "i", "j", and the like. When the character widths are smaller than a preset value, two kinds of normalizations are effected and the character recognizing processings are put into effect, in order to prevent the rejection of rendering of erroneous reading.

What is claimed is:

1. An apparatus for recognizing characters, comprising:
   character width detecting means which measures the width of a character;
   first normalizing means which normalizes said character in the directions of height and width;
   second normalizing means which normalizes the character in the direction of height only when said measured width value is smaller than a preset value;
   first and second comparator means which compare and collate the normalized characters obtained by the first and second normalizing means with a reference; and
   recognition means which selects a category of the reference, having a higher coincidence degree as a recognition basis.

2. An apparatus for recognizing characters according to claim 1, further comprising a converting means which converts a character printed or typewritten onto a slip into an electric video signal.

3. An apparatus for recognizing character according to claim 2, wherein said converting means converts said character into a binary video signal.

4. An apparatus for recognizing characters according to claim 1, wherein said first normalizing means performs the normalization irrespective of the value measured by said character width detecting means.

5. An apparatus for recognizing characters, comprising:
   width detecting means for detecting the width of a character;
   first means for normalizing a character in first and second directions to generate a first normalized character;
   second means for normalizing said character in only said first direction to generate a second normalized character;
   comparison means for comparing said first and second normalized characters to reference patterns;
   discriminating means for recognizing said character in accordance with the results of said comparisons; and
   means responsive to the detected width of said character for disabling said second means when said width is greater than a predetermined value.

6. A character recognition method comprising the steps of: measuring the width of a character; performing a first normalizing step wherein said character is normalized in the direction of height only when said measured width is smaller than a predetermined value to obtain a first normalized character; performing a second normalizing step wherein said character is normalized in the directions of both height and width to obtain a second normalized character; comparing and collating the normalized characters with a reference figure; and providing a category of the reference figure having higher degree of coincidence as a recognition result.

7. A method of recognizing characters, comprising the steps of:
   detecting the width of a character;
   normalizing said character in the directions of height and width to obtain a first normalized character;
   normalizing said character in the direction of height only to obtain a second normalized character when the measured width value is smaller than a preset value;
   comparing and collating the first and second normalized characters with reference characters; and
   recognizing said character on the basis of the comparison which yields the highest degree of coincidence.

* * * * *